Jan. 26, 1960
R. TEXTROM
2,922,212
CLAMP APPARATUS OR THE LIKE
Filed April 30, 1957
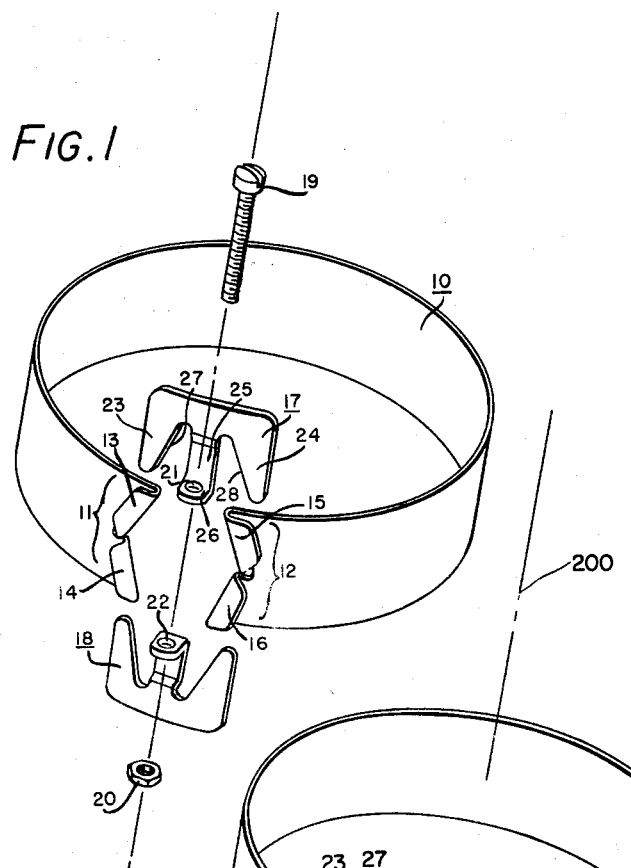
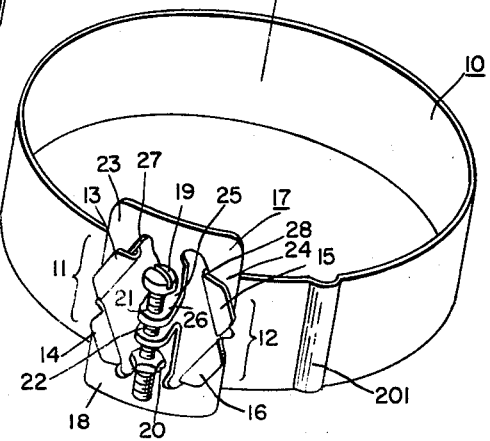
RALPH TEXTROM
*INVENTOR.*
BY
HIS ATTORNEY

United States Patent Office 2,922,212
Patented Jan. 26, 1960

2,922,212

CLAMP APPARATUS OR THE LIKE

Ralph Textrom, Los Angeles, Calif., assignor to Hoffman Electronics Corporation, a corporation of California Application April 30, 1957, Serial No. 656,104

1 Claim. (Cl. 24—268)

The present invention is related to clamp apparatus and, more particularly, to new and improved clamp apparatus which may be adjusted to provide with a high degree of exactitude the desired, inwardly directed pressure along a circumferential area of the wall of an enclosed member with which the clamp apparatus is associated, and which also may be adjusted by a conventional screw driver, for example, positioned in a convenient manner parallel to the central axis of the clamp apparatus.

In the past, there have been developed many types of clamps for a variety of purposes. The clamping mechanisms of which the inventor is aware appear to have certain deficiencies when such clamp mechanisms are utilized for a number of particular purposes, as for example where the clamp mechanism is to be utilized in connection with electronic equipment in which, by reason of the desired compactness of electronic equipment, it would be highly desirable to regulate precisely the pressure which the clamp would exert upon associated equipment; also it would be desirable to adjust the clamp from a position above the clamp device. The clamps extant, of which the inventor is aware, are adjusted by screw driver means in a direction tangential to and in the plane of the clamp—a highly undesirable feature for clamp utilization with compact electronic equipment. Furthermore, the clamps that are known to the inventor do not provide for the regulation of pressure to be exerted by the clamp upon associated tubing, for example, but rather the pressure exerted is solely dependent upon the pitch of the screw threads of the screw means generally used in conjunction with the clamp for the tightening thereof.

Therefore, it is an object of the present invention to provide a new and useful clamp construction.

It is a further object of the present invention to provide a new and useful clamp construction wherein the clamp may be adjusted for the loosening or tightening thereof from a position above the clamp.

It is an additional object of the present invention to provide a new and useful clamp construction in which the degree of pressure by the clamp upon associated apparatus may be adjusted with relative precision.

According to the present invention, first and second jaw-type means cooperate with suitably configured end portions of a circular clamp, strap member in a manner such that the distance between the first and second jaw-type means will determine the diameter and circumference of the clamp mechanism. The first and second jaw-type means are physically intercoupled by screw means, for example, which may be adjusted by a simple screw driver disposed in a direction parallel to the axis of the circular strap member of the clamp.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which, Figure 1 is an exploded view of clamp apparatus according to the present invention.

Figure 2 is a perspective, assembly view of the apparatus as shown in Figure 1.

In Figure 1, circular strap member 10 is provided with first and second opposite end portions 11 and 12. End portion 11 is provided with upper and lower, doubled back lip portions 13 and 14 each disposed in such a manner as to present a channel-type configuration, with the base areas of the channels assuming oppositely inclined dispositions, respectively. Correspondingly, end portion 12 of circular strap member 10 is provided with upper and lower lip portions 15 and 16 of the doubled back configuration whereby the channels formed by the lip portions and the main body of circular strap member 10 present channel-like areas respectively inclined in opposite directions. Jaw means 17 and 18 may be completely congruent parts and the spacing between the jaw means 17 and 18 may be controlled by the nut 20 and screw 19, the latter passing through apertures 21 and 22 of the jaw means 17 and 18, respectively.

Each jaw means may be chosen to have a first leg portion 23, a second leg portion 24, and a central leg portion 25. The central leg portion 25 may be provided with a 90° upturned flange portion 26 which, as shown, is provided with aperture 21, in the case of jaw means 17. It is to be noted that the leg portions 23 and the leg portions 24 of the respective jaw means have inclined, internal, traveling edges 27 (or 28) which cooperate with the base areas of the channels delineated by the cooperation of lip portions 13 and 15, for example, with the main body of circular strap 10.

The internal traveling edges of the first and second leg portions of each jaw means are, as before indicated, adapted for slidable travel along the base areas of the aforementioned channel areas. The positioning of apertures 21 and 22 in the flange areas associated with the central leg portions of each jaw means may be determined so that a face of hexnut 20, for example, will cooperate in flush relationship with the central leg portion of the lower jaw means so that the adjustment of screw 19 by a conventional screw driver will not be accompanied by the unwanted rotation of nut 20.

The operation of the apparatus shown in Figure 1 is illustrated in Figure 2 which constitutes an assembly view of the apparatus. It will be seen by reference to Figure 2 that when screw 19 is rotated clockwise the two jaw means will approach each other. Accordingly, the pressure exerted upon both channel areas of each end portion of the circular strap member 10 by the internal edges of the leg portions of both jaw means will cause end portions 11 and 12 of strap 10 to approach each other, thus producing a contraction of the clamp mechanism. This is of course due to the advancing of the leg portions of each jaw means upon the inclined base surfaces of the four channel areas shown. Rotation of screw 19 in a counter-clockwise direction will result in a progressive thrusting apart of the two jaw means, by virtue of the pressure components exerted upon each jaw means by end portions 11 and 12 of strap 10. The slope of the channel areas may be made as small as desired so that many turns of the adjustment screw 19 will be required in order to change the diameter of strap 10 a fraction of an inch. It is to be noted that the adjustment of adjustment screw 19 may be accomplished by the use of a conventional screw driver positioned in a manner parallel to central axis 200 of the circular strap member 10. Thus, the apparatus is ideally suited to adjustment from a position above the clamp, a place where there will generally be easy access to the equipment.

For purposes of strength, it is desirous that the upper and lower jaw means 17 and 18 be fabricated from stainless steel. The material of circular strap 10 will of course be determined by the material of the tubular member with which the clamp mechanism is to be associated. If, for example, the tubing material were aluminum, then it would be desirable to fabricate circular strap member 10 from beryllium copper which has been appropriately tempered, since the coefficients of thermal expansion of aluminum and beryllium copper are roughly equivalent to each other.

An added feature of the present invention is illustrated in Figure 2 by the incorporation in circular strap member 10 of bead area 201. Bead area 201 serves for the purpose of temperature compensation, which compensation may be needed for slight differences in alphas or coefficients of thermal expansion of the strap material from the tubing material.

The operation of bead area 201 in circular strap member 10 is as follows. In the presence of increasing temperatures, circular strap member 10 will expand, and if the material of the tubular member enclosed within the clamp were to expand more in diameter than the diameter of the clamp mechanism, then, rather than suffer increased pressure upon the wall of the enclosed tubular member (not shown), the bead area 201 will flatten in spring-like manner so that the pressure exerted upon the enclosed member by the spring mechanism will be relatively constant.

Purely by way of example of application, it has been found that the present clamp mechanism is ideally suited, in the case of electronic applications, for retaining in appropriate position the anode ring of a 2C39A high frequency triode transmitting tube within an associated, longitudinally split cylindrical sleeve normally associated with the triode tube.

The clamp mechanism of the subject invention is proven to be substantially vibration-proof and shock-proof. While the tension exerted by the clamp mechanism upon screw 19 and nut 20 itself may well be sufficient to prevent the inadvertent loosening of screw 19 and the subsequent misadjustment of the clamp mechanism, yet it is desirable to use an elastic stopnut or fiber locknut of some type in connection with screw 19. It will also be understood that, rather than employ nut 20 at all, aperture 22 may be threaded for positive cooperation with screw 19.

For emphasis, it will be mentioned again that the clamp mechanism of the subject invention is ideally suited for incorporation in compact electronic equipment since it will be noted, particularly with reference to Figure 2, that the adjustment of the clamp mechanism is not made from the right or left side (as is conventionally the case with present clamp mechanisms), where other electronic equipment may interfere with the placement of the necessary screw driver, but rather from the top of the equipment where access space is not at a premium.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

An adjustable clamping device comprising an annular band member having a central axis and two opposite ends facing each other, each of said ends including a pair of oppositely inclined channel formations spaced apart from each other in a direction generally parallel to said axis, a pair of E-shaped clamping jaw members each extending between a pair of said channel formations on opposite ends of said band member; each of said jaw members having first and second coplanar flanges constituting the outer legs of the E, said legs having inclined, internal traveling edges adapted to cooperate with the base areas of the corresponding channel formations, each of said jaw members also having an intermediate leg corresponding to the central leg of the E; and threaded connector means engaging and extending between the intermediate legs of said respective jaw members in a direction substantially parallel to said axis, whereby said threaded connector means serves to hold said jaw members in place on said clamping device while providing a means for adjusting the clamping force of said device by adjusting the relative distance between said jaw members in a direction parallel to said axis, to adjust the distance between said ends of said annular band in accordance with the pitch of said inclined traveling edges.

References Cited in the file of this patent

UNITED STATES PATENTS

| | | |
|---|---|---|
| 732,309 | Marshall | June 30, 1903 |
| 1,277,076 | Ireland | Aug. 27, 1918 |
| 1,351,366 | Bowman | Aug. 31, 1920 |
| 1,363,329 | Levedahl | Dec. 28, 1920 |
| 1,912,006 | Mischler | May 30, 1933 |
| 2,599,882 | Adams | June 10, 1952 |
| 2,778,085 | Bernard | Jan. 22, 1957 |

FOREIGN PATENTS

| | | |
|---|---|---|
| 71,019 | Austria | Jan. 25, 1916 |
| 421,634 | Germany | Apr. 1, 1926 |